United States Patent
Kim et al.

(10) Patent No.: US 8,730,272 B2
(45) Date of Patent: May 20, 2014

(54) APPARATUS AND METHOD FOR CONTROLLING DUAL DISPLAY DEVICE USING RGB INTERFACE

(75) Inventors: Hyo-June Kim, Seoul (KR); Jeong-Man Han, Gumi-si (KR)

(73) Assignee: Mtekvision Co., Ltd., Seoul (KR)

( * ) Notice: Subject to any disclaimer, the term of this patent is extended or adjusted under 35 U.S.C. 154(b) by 607 days.

(21) Appl. No.: 12/902,593

(22) Filed: Oct. 12, 2010

(65) Prior Publication Data

US 2011/0157106 A1 Jun. 30, 2011

(30) Foreign Application Priority Data

Dec. 31, 2009 (KR) .................. 10-2009-0135506

(51) Int. Cl.
*G09G 5/10* (2006.01)

(52) U.S. Cl.
USPC ............. 345/690; 345/77; 345/87; 345/89; 345/204

(58) Field of Classification Search
USPC ........... 345/1.3, 3.1, 55, 84, 87, 98, 104, 204, 345/690, 63, 77, 89, 502
See application file for complete search history.

(56) References Cited

U.S. PATENT DOCUMENTS

| 2004/0155848 | A1* | 8/2004 | Kudo et al. | 345/89 |
| 2009/0278779 | A1* | 11/2009 | Liu et al. | 345/98 |
| 2011/0148888 | A1* | 6/2011 | Jacobs et al. | 345/502 |

FOREIGN PATENT DOCUMENTS

| JP | 2004-264516 A | 9/2004 |
| KR | 10-2004-0073948 A | 8/2004 |

* cited by examiner

*Primary Examiner* — Abbas Abdulselam
*Assistant Examiner* — Insa Sadio
(74) *Attorney, Agent, or Firm* — Birch, Stewart, Kolasch & Birch, LLP

(57) ABSTRACT

Dual display control device and method using an RGB interface are provided. A dual display control device controlling a first display device and a second display device using an RGB interface includes: a synchronization signal output unit that outputs vertical and horizontal synchronization signals to the first display device and the second display device; and a data output unit that outputs first data to the first display device in a first section of a first pixel clock and outputs second data to the second display device in a second section of a second pixel clock, in accordance with the vertical and horizontal synchronization signal via a data line shared by and connected to the first display device and the second display device. Accordingly, it is possible to reduce the number of signal lines, thereby embodying an efficient hardware configuration.

12 Claims, 9 Drawing Sheets

APPARATUS AND METHOD FOR CONTROLLING DUAL DISPLAY DEVICE USING RGB INTERFACE

CROSS REFERENCE

This application is based on and claims priority under 35USC 119 from Korean Patent Application No. 10-2009-0135506, filed on Dec. 31, 2009.

BACKGROUND

1. Field of the Invention

The present invention relates to a display control device, and more particularly, to dual display control device and method using an RGB interface.

2. Description of the Related Art

With the development of electronic apparatuses, a display device outputting data and images has been used in various electronic apparatuses. For example, a display device mounted on a personal computer or a mobile device outputs an image by an internal signal process and in response to a signal operated by a user interface.

According to the related art, various interface systems which can be replaced for an existing CPU interface system have been developed with the recent enlargement of a displace screen. In the CPU interface system, CS (Chip Select) pins are divided and the other control signals (RS, WE, RE, and the like) and data signals are shared, whereby the CS pin corresponding to a desired display device and image data is transmitted via the shared other signal lines. However, in the display system using an RGB interface, only one display device is controlled to display an image. Here, control signals and data signals should be separated and independent interfaces therefor should be provided to support dual display. Therefore, in the RGB interface system, there are various problems with the complexity of circuitry and the increase in cost for supporting the dual display.

FIG. 1 is a block diagram illustrating the configuration of a dual display system using an RGB interface according to the related art. Referring to FIG. 1, the dual display system includes a controller 110, a first display controller 111, a second display controller 112, a first display device 121, and a second display device 122. As shown in FIG. 1, the first display controller 111 outputs a pixel clock PCLK1, vertical and horizontal synchronization signals Vsync1 and Hsync1, and a data signal Data1[0:24] to the first display device 121 to control the first display device 121, and the second display controller 112 outputs a pixel clock PCLK2, vertical and horizontal synchronization signals Vsync2 and Hsync2, and a data signal Data2[0:24] to the second display device 122. In this system, since the hardware circuit design is complex and plural display controller 111 and 112 should be provided, there is a problem with an increase in cost.

SUMMARY

An advantage of some aspects of the invention is that it provides dual display control device and method using an RGB interface, which can reduce the number of signal lines to embody an efficient hardware configuration and can construct various low-cost systems.

Another advantage of some aspects of the invention is that it provides dual display control device and method, which can variously embody a signal sharing method and a data outputting method corresponding thereto to control a dual display device.

Other advantages of the invention will be easily understood from the following description.

According to an aspect of the invention, there is provided a dual display control device controlling a first display device and a second display device using an RGB interface, including: a synchronization signal output unit that outputs vertical and horizontal synchronization signals to the first display device and the second display device; and a data output unit that outputs first data to the first display device in a first section of a first pixel clock and outputs second data to the second display device in a second section of a second pixel clock, in accordance with the vertical and horizontal synchronization signal via a data line shared by and connected to the first display device and the second display device.

The first section of the first pixel clock and the second section of the second pixel clock may be rising edge sections. The first pixel clock and the second pixel clock may have a phase difference.

The first pixel clock and the second pixel clock may be the same pixel clock In this case, the first section of the pixel clock may be a rising edge section, and the second section of the pixel clock may be a falling edge section.

The synchronization signal output unit may output the vertical and horizontal synchronization signals to the first display device and the second display device via a shared and connected signal line.

The synchronization signal output unit may output the vertical and horizontal synchronization signals to the first display device and the second display device via a plurality of different signal lines, respectively. In this case, the synchronization signal output unit may output the vertical and horizontal synchronization signals corresponding to different resolutions to the first display device and the second display device via the plural signal lines.

According to another aspect of the invention, there is provided a dual display control method of a dual display control device controlling a first display device and a second display device using an RGB interface, including the steps of: outputting vertical and horizontal synchronization signals to the first display device and the second display device; and outputting first data to the first display device in a first section of a first pixel clock and outputting second data to the second display device in a second section of a second pixel clock, in accordance with the vertical and horizontal synchronization signal via a data line shared by and connected to the first display device and the second display device.

The first section of the first pixel clock and the second section of the second pixel clock may be rising edge sections. The first pixel clock and the second pixel clock may have a phase difference.

The first pixel clock and the second pixel clock may be the same pixel clock In this case, the first section of the pixel clock may be a rising edge section, and the second section of the pixel clock may be a falling edge section.

The vertical and horizontal synchronization signals may be output to the first display device and the second display device via a shared and connected signal line.

The vertical and horizontal synchronization signals may be output to the first display device and the second display device via a plurality of different signal lines, respectively. In this case, the vertical and horizontal synchronization signals corresponding to different resolutions may be output to the first display device and the second display device via the plural signal lines.

Other aspects, features, and advantages will become apparent from the accompanying drawings, the appended claims, and the detailed description.

The dual display control device and method using an RGB interface according to the invention can reduce the number of signal lines to embody an efficient hardware configuration and can construct various low-cost systems. It is also possible to variously embody a signal sharing method and a data outputting method corresponding thereto.

DESCRIPTION OF EXEMPLARY EMBODIMENTS

Figure 1:
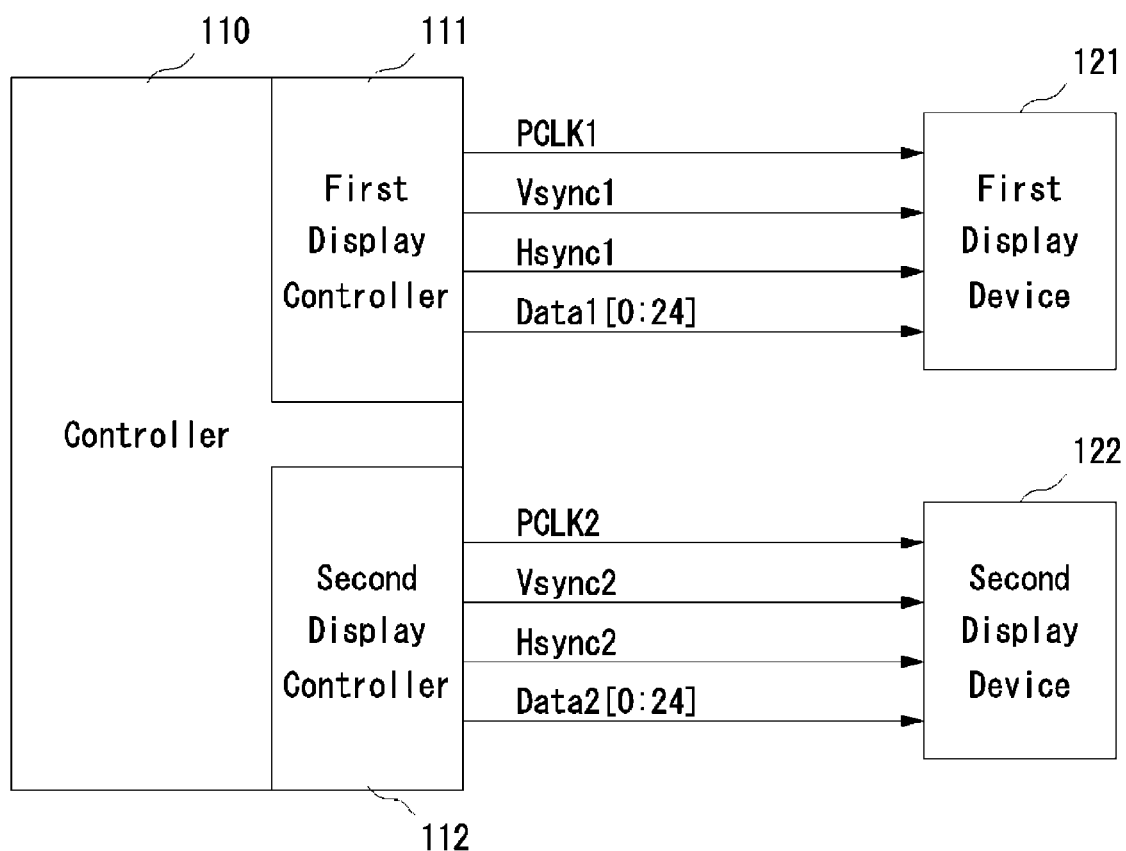
FIG. 1 is a block diagram illustrating the configuration of a dual display system using an RGB interface according to the related art.

The invention can be variously modified in various forms and specific embodiments will be described and shown in the drawings. However, the embodiments are not intended to limit the invention, but it should be understood that the invention includes all the modifications, equivalents, and replacements belonging to the spirit and the technical scope of the invention.

Terms such as "first" and "second" can be used to describe various elements, but the elements are not limited to the terms. The terms are used only to distinguish one element from another element. For example, without departing from the scope of the invention, a first element may be named a second element and the second element may be named the first element, similarly. The term, "and/or", includes a combination of plural elements or any one of the plural elements.

The terms used in the following description are used to merely describe specific embodiments, but are not intended to limit the invention. An expression of the singular number includes an expression of the plural number, so long as it is clearly read differently. The terms such as "include" and "have" are intended to indicate that features, numbers, steps, operations, elements, components, or combinations thereof used in the following description exist and it should be thus understood that the possibility of existence or addition of one or more different features, numbers, steps, operations, elements, components, or combinations thereof is not excluded.

Hereinafter, in describing the invention with reference to the accompanying drawings, like elements are referenced by like reference numerals regardless of the drawing number and repeated description thereof is not made. When it is determined that detailed description of known techniques involved in the invention makes the gist of the invention obscure, the detailed description will not be made.

Figure 2:
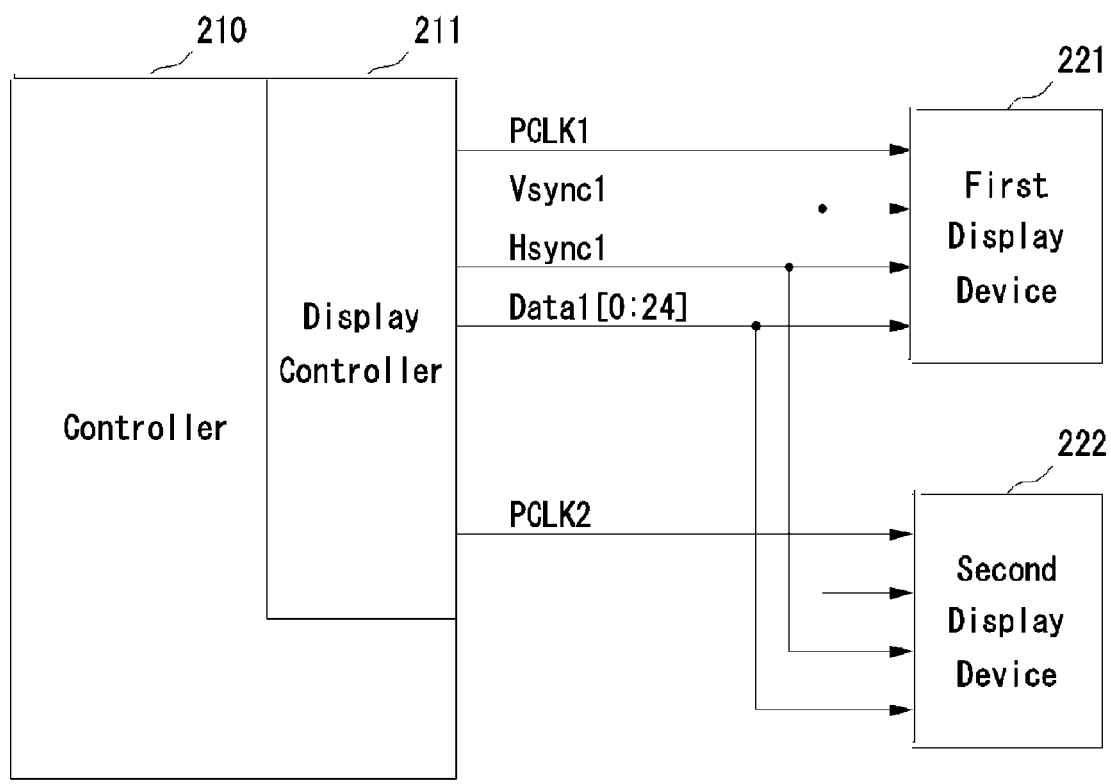
FIG. 2 is a block diagram illustrating the configuration of a dual display system using an RGB interface according to an embodiment of the invention.

FIG. 2 is a block diagram illustrating the configuration of a dual display system using an RGB interface according to an embodiment of the invention. Referring to FIG. 2, the dual display system includes a controller 210, a display controller 211, a first display device 221, and a second display device 222.

In the invention, an RGB interface system is used and various control signals and/or data signals are shared to control a dual display device, whereby it is possible to reduce the number of signal lines and to unify the controller controlling the dual display device and it is thus possible to reduce the cost. The invention specifically provides systems of causing the first display device 221 and the second display device 222 to share the signals and methods of outputting data in the respective systems, thereby embodying the dual display device in various ways. Various embodiments of the invention will be described in detail below.

The controller 210 controlling a main body connected to the display devices and the display controller 211 directly controlling the display devices are shown in FIG. 2. The display controller 211 outputs signals to be described later. The dual display control device using an RGB interface according to an embodiment of the invention includes the display controller 211 controlling the display devices.

In this embodiment, images are output by supplying two pixel clocks PCLK with a predetermined phase difference to the first display device 2221 and the second display device 222 so as to support the dual display, and sharing other signals Vsync, Hsync, and Data to fetch data at the rising edges of the pixel clocks. Here, the phase difference of two pixel clocks may be a degree sufficient to distinguish the pixel clocks from each other, and may be, for example, 90 degrees, 180 degrees, or the like. In this embodiment, some possible signals are shared in the RGB interface, thereby reducing the number of signal lines and unifying the display controller 211 to reduce the cost.

The signals used in the RGB interface system include synchronization signals such as a vertical synchronization signal Vsync and a horizontal synchronization signal Hsync, pixel clocks PCLK, and data signals Data[0:24]. In this embodiment, the signal lines for transmitting the vertical synchronization signal Vsync, the horizontal synchronization signal Hsync, and data are shared by the first display device 221 and the second display device 222. To transmit corresponding image data to the first display device 221 and the second display device 222, a pixel clock is divided into plural pixel clocks such as a first pixel clock PCLK1 and a second pixel clock PCLK2 and the divided pixel clocks are output to the first display device 221 and the second display device 222, respectively. The first pixel clock and the second pixel clock may be signals having a predetermined phase difference as described above.

Figure 3:
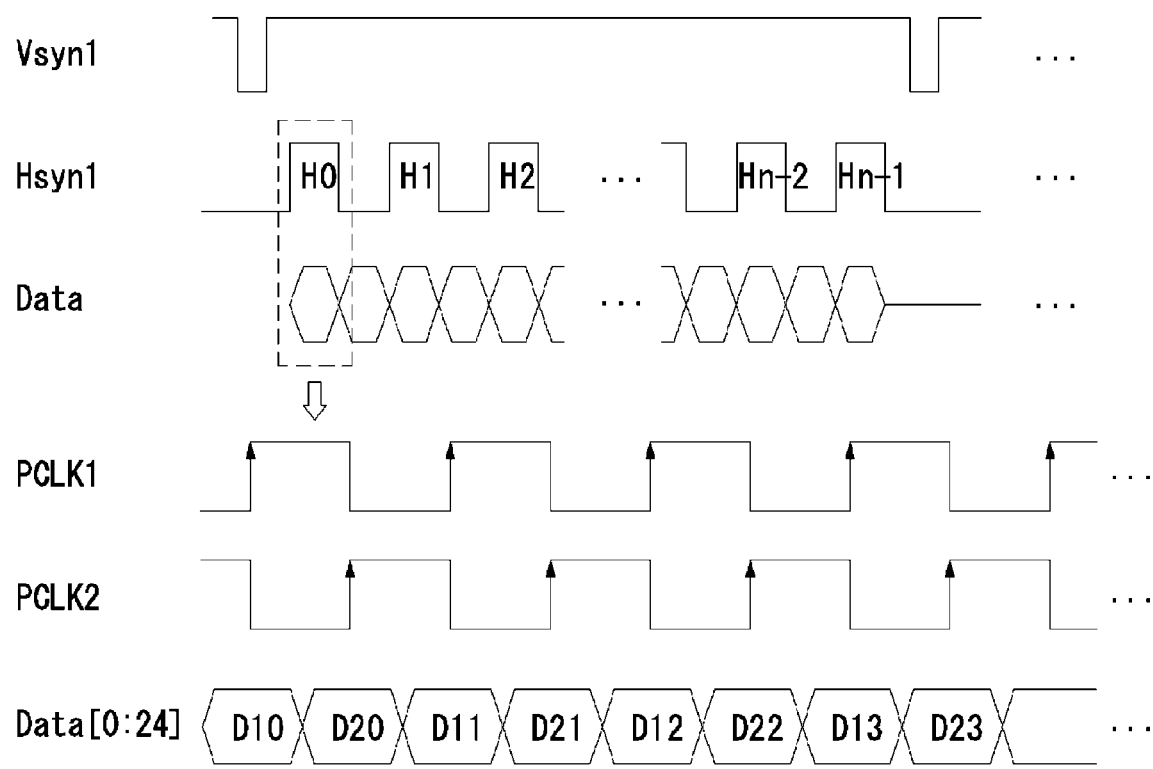
FIG. 3 is a signal timing diagram of the RGB interface according to the embodiment of the invention.

FIG. 3 is a timing diagram illustrating signals in the RGB interface according to this embodiment. The horizontal synchronization signal Hsync is output in a specific section of the vertical synchronization signal Vsync and data is output in accordance with the signal. Here, the display controller 211 transmits data so as to output image data signals $D1_0$, $D1_1$, $D1_2$, $D1_3$, ... to the first display device 221 in the rising edge section of the first pixel clock and to output image data signals $D2_0$, $D2_1$, $D2_2$, $D2_3$, ... to the second display device 222 in the rising edge section of the second pixel clock The first display device 221 and the second display device 222 output images corresponding to the received data signals.

Here, the first display device 221 and the second display device 222 may be devices that can output images in various systems such as a CRT, a PDP (Plasma Display Panel), an LCD (Liquid Crystal Display), an OLED (Organic Light Emitting Diode), a VFD, an FED, a 3D display, a flexible display, and a head-up display.

Figure 4:
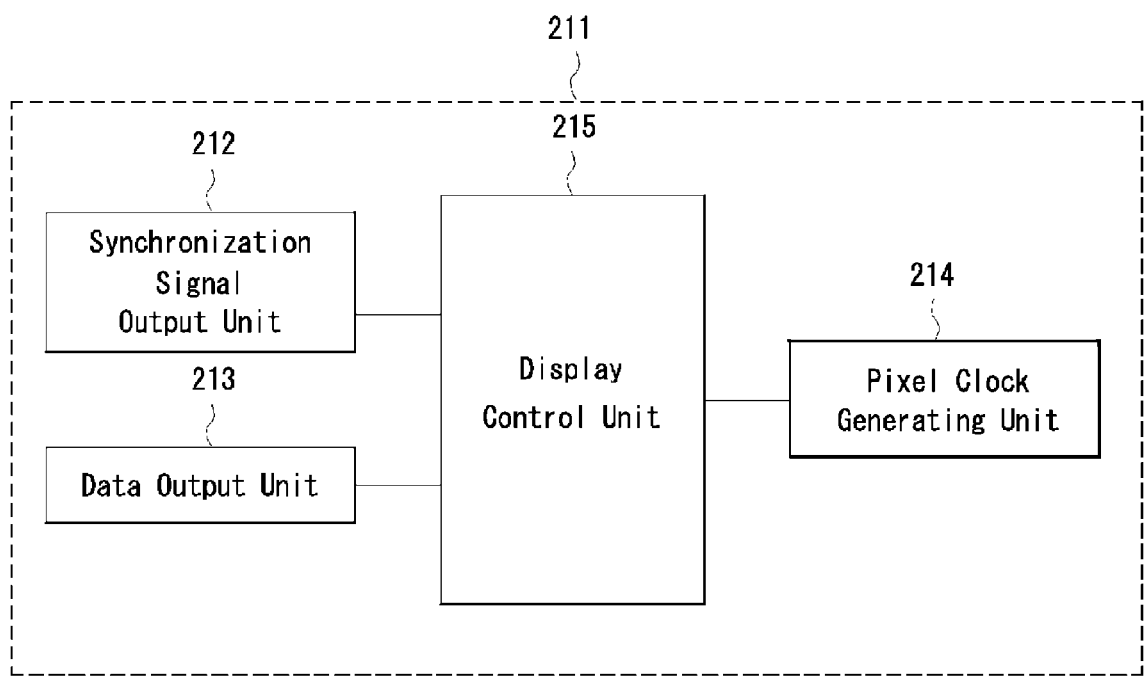
FIG. 4 is a block diagram illustrating a dual display controller using an RGB interface according to the embodiment of the invention.

FIG. 4 is a block diagram illustrating the configuration of the dual display controller using an RGB interface according to an embodiment of the invention. Referring to FIG. 4, the display controller 211 includes a synchronization output signal unit 212, a data output unit 213, a pixel clock generating unit 214, and a display control unit 215.

The synchronization signal output unit 212 outputs synchronization signals such as the vertical synchronization signal Vsync and the horizontal synchronization signal Hsync to the first display device 221 and the second display device 222. The vertical synchronization signal is a signal used to match start points for scanning one field in the display controller 211 and the display devices to each other. The vertical synchronization signal has a frequency smaller than that of the horizontal synchronization signal and thus has a longer duty ratio.

As described above, the data output unit 213 outputs the image data signals $D1_0, D1_1, D1_2, D1_3, \ldots$ to the first display device 221 in the rising edge section of the first pixel clock and outputs the image data signals $D2_0, D2_1, D2_2, D2_3, \ldots$ to the second display device in the rising edge section of the second pixel clock The first display device 221 and the second display device 222 output images corresponding to the received data signals in accordance with the first pixel clock and the second pixel clock. In addition, the data output unit 213 can output data in accordance with the pixel clocks in various embodiments to be described later.

In this embodiment, the display controller may further include a timing controller controlling the timing for outputting data in a specific section of the pixel clocks. In this case, the timing controller performs control so as to output data in accordance with the frequency and the specific section of the pixel clocks in cooperation with the data output unit 213.

The pixel clock generating unit 214 generates and outputs the pixel clocks in accordance with predetermined period, number, and phase difference. The display control unit 215 controls the synchronization signal output unit 212, the data output unit 213, and the pixel clock generating unit 214.

Figure 5:
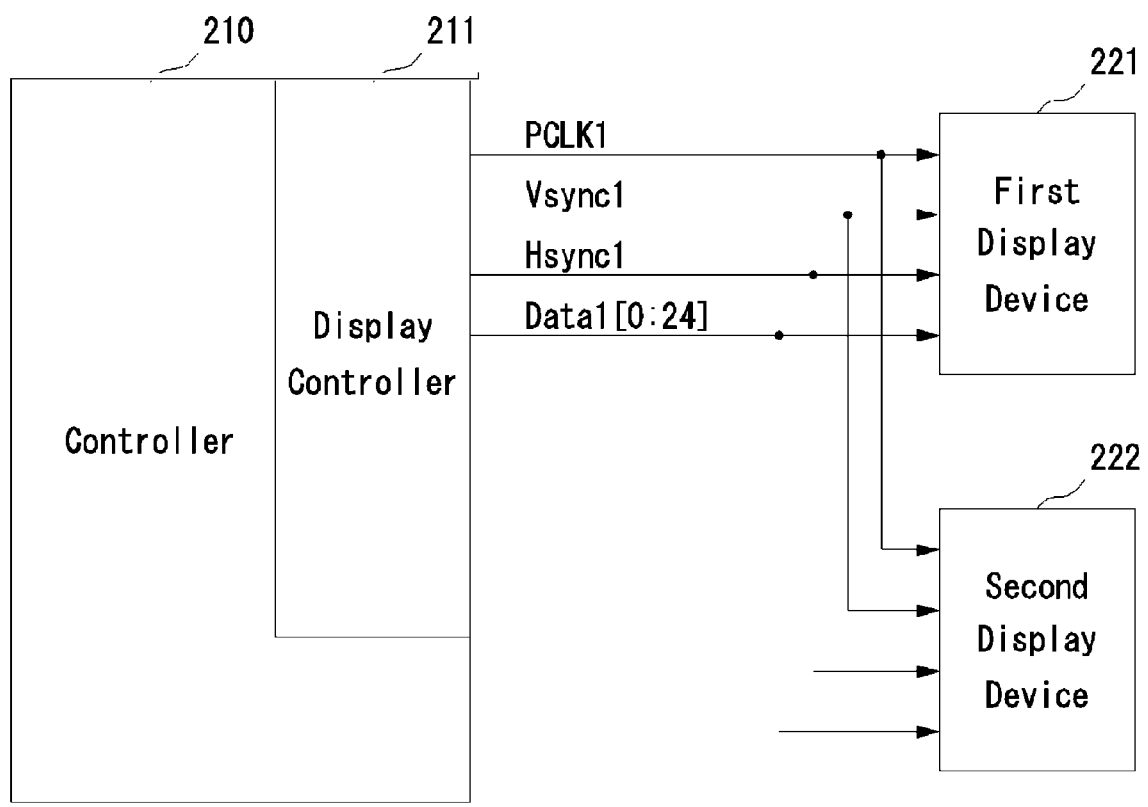
FIG. 5 is a block diagram illustrating the configuration of a dual display system using an RGB interface according to another embodiment of the invention.

FIG. 5 is a block diagram illustrating the configuration of a dual display system using an RGB interface according to another embodiment of the invention. Referring to FIG. 5, the dual display system includes a controller 210, a display controller 211, a first display device 221, and a second display device 222. Differences from the above-described configuration will be mainly described.

In this embodiment, one pixel clock is shared so that the display controller 211 controls the first display device 211 and the second display 222 using the pixel clock, whereby it is possible to reduce the number of signal lines, thereby simplifying the circuit configuration.

The display controller 211 outputs a single pixel clock PCLK1, vertical and horizontal synchronization signals Vsync1 and Hsync1, and data signals Data[0:24] to the first display device 221 and the second display device 222 via a signal line shared by the first display device 221 and the second display device 222.

Figure 6A:
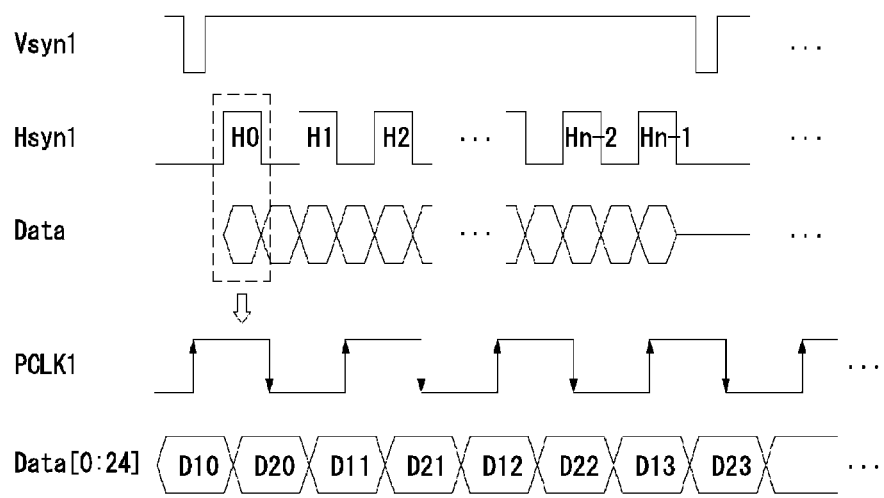
FIGS. 6A and 6B are signal timing diagrams of the RGB interface according to another embodiment of the invention.

Referring to FIG. 6A, the first display device 221 receives image data signals $D1_0, D1_1, D1_2, D1_3, \ldots$ in a rising edge section of the pixel clock and outputs the corresponding images. The second display device 222 receives image data signals $D2_0, D2_1, D2_2, D2_3, \ldots$ in a falling edge section of the pixel clock and outputs the corresponding images. In this case, the second display device 222 can fetch the image data using a pixel clock inverting function built therein.

Figure 6B:
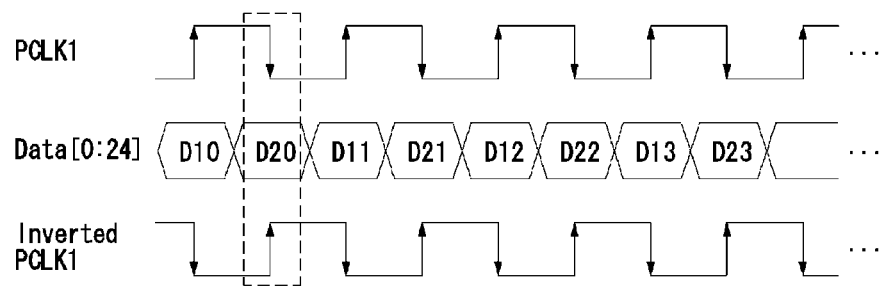
Figure 7:
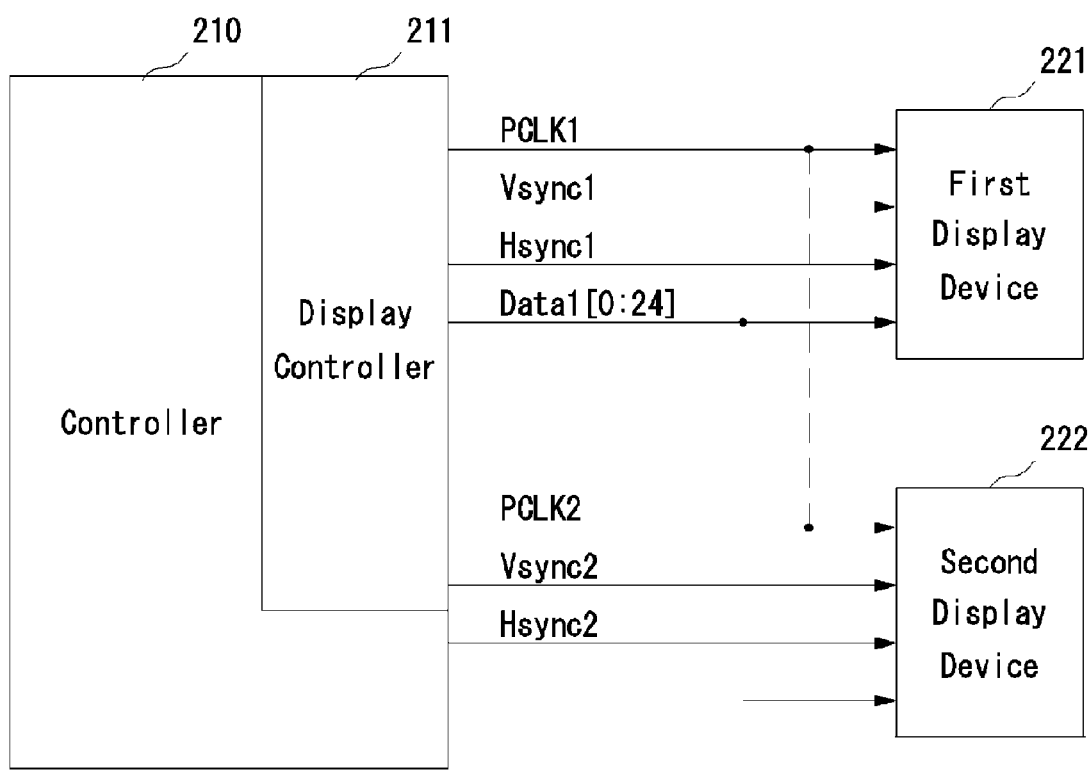
FIG. 7 is a block diagram illustrating the configuration of a dual display system using an RGB interface according to another embodiment of the invention.

Referring to FIG. 6B, the pixel clock is inverted by an inverting unit built in the second display device 222. When the pixel clock PCLK1 runs in the order of High→Low→High→Low, the inverting unit inverts the order and generates an inverted pixel clock Inverted PCLK1 that runs in the order of Low→High→Low→High. The second display device 222 outputs an image corresponding to the image data in the rising edge section of the inverted pixel clock FIG. 7 is a block diagram illustrating the configuration of a dual display system using an RGB interface according to an embodiment of the invention. Referring to FIG. 7, the dual display system includes a controller 210, a display controller 211, a first display device 221, and a second display device 222. Differences from the above-described configuration will be mainly described.

In this embodiment, when the first display device 221 and the second display device 222 have resolutions different from each other, the vertical and horizontal synchronization signals are not shared but are output via individual signal lines. Accordingly, the single display controller 211 can control plural display devices having different resolutions.

Figure 8A:
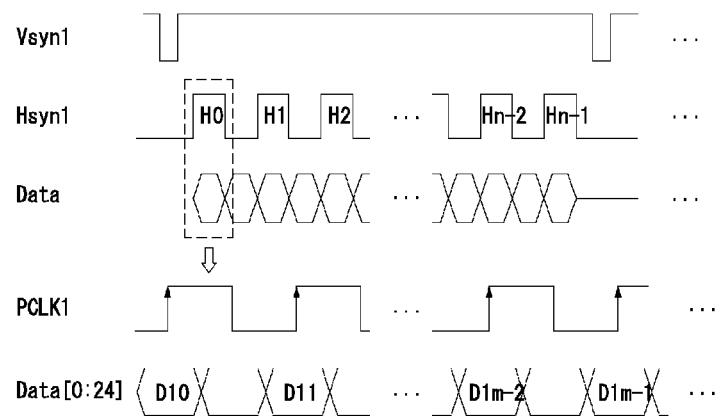
FIGS. 8A and 8B are signal timing diagrams of the RGB interface according to another embodiment of the invention.
Figure 8B:
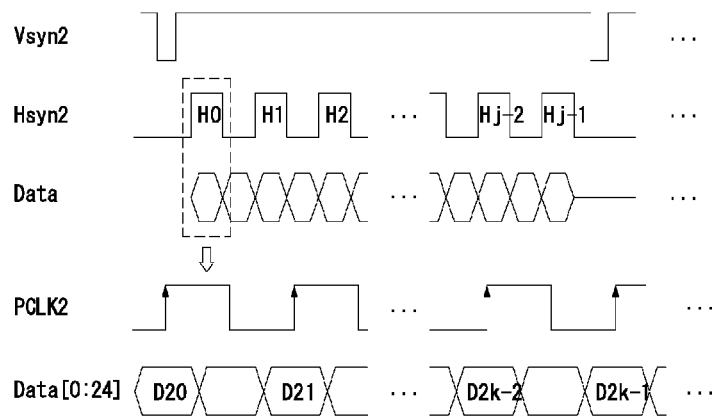

FIG. 8A is a signal timing diagram of the first display device 221. As shown in the drawing, the first display device 221 supports a resolution of m×n. That is, n sections of the horizontal synchronization signal are output form a single vertical synchronization signal, and m data signals are output for a single section of the horizontal synchronization signal. FIG. 8B is a signal timing diagram of the second display device 222. As shown in the drawing, the second display device 222 supports a resolution of k×j. Therefore, the display controller 211 according to this embodiment can support the different resolutions of the plural display devices, thereby controlling various types of display devices.

Here, the pixel clocks are individual signals (see FIG. 2) having a phase difference. However, the pixel clocks may be a single signal (see FIG. 5) of which different edge sections can be used.

Figure 9:
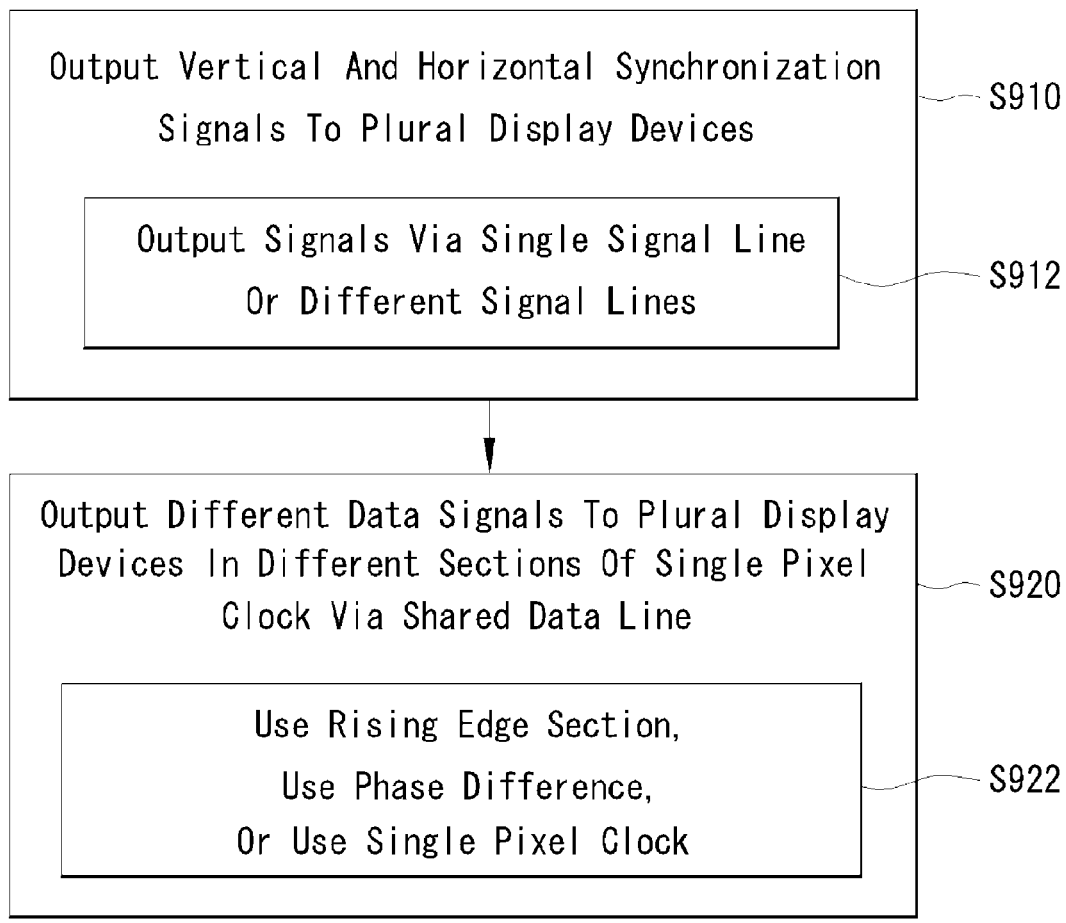
FIG. 9 is a flow diagram illustrating the flow of a dual display control method using an RGB interface according to an embodiment of the invention.

FIG. 9 is a flow diagram illustrating a dual display control method using an RGB interface according to an embodiment of the invention. This flow can be carried out mainly by the display controller 211.

In step S910, the vertical and horizontal synchronization signals are output to the first display device 221 and the second display device 222. In this case, as described above, the system for sharing signal lines can be embodied in various forms.

In sep S912, various forms of sharing the signal lines are embodied. For example, the vertical and horizontal synchronization signals and the data are may be shared, the vertical and horizontal synchronization signals, the data, and the pixel clock may be shared, or only the horizontal synchronization signal may not be shared. The display controller 211 can output the corresponding signals depending on these forms.

In step S920, the display controller 211 outputs different data signals to the first display device 221 and the second display device 222 using different sections of the pixel clock via the shared data line. This process of step can be performed at the same time as performing the step of outputting the vertical and horizontal synchronization signals.

In step S922, various methods of utilizing the pixel clock to transmit data are embodied. For example, the display controller 211 outputs first data to the first display device 221 in a first section of a first pixel clock and outputs second data to the second display device 221 in a second section of a second clock, in the vertical and horizontal synchronization signals via the data line shared by and connected to the first display device 221 and the second display device 222. Here, the first section and the second section may be a rising edge section and a falling edge section, respectively. The display controller 211 may output different data signals to the first display device 221 and the second display device 222 using different sections of a single pixel clock.

In the dual display control device using an RGB interface according to the embodiments of the invention, common platform techniques such as a specific specification, an embedded system, and an OS (Operating System) and interface standardization techniques such as communication protocols and I/O interfaces are obvious to those skilled in the art and thus are not described.

The dual display control method using an RGB interface according to the invention may be embodied in the form of program commands which can be carried out by various computers and may be recorded on a computer-readable recording medium. That is, the recording medium may be a computer-readable recording medium having recorded thereon a program for causing a computer to carry out the above-mentioned process steps.

The computer-readable recording medium may include a program command, a data file, and a data structure singly or in combination thereof The program command recorded on the recording medium may be particularly designed and constructed for the invention, or may be known to and used by those skilled in the art of computer software. Examples of the computer-readable recording medium include optical media such as CD-ROM and a DVD, magneto-optical media such as a floptical disk, and hardware devices such as a ROM, a RAM, and a flash memory configured to store and carry out the program command.

The recording medium may be transmission medium such as light including carrier waves for transmitting a signal designating a program command or a data structure, metal lines, and waveguides. Examples of the program command include machine-language codes prepared by a compiler and high-grade language codes computer-executable by an interpreter. The hardware devices may be configured to serve as one or more software modules for carrying out the operations of the invention.

While the configurations of the controller and the output signals in the dual display control device and method using an RGB interface according to the invention have been described with reference to the embodiments, the invention is not limited to the configurations. When the configuration of the controller or the type of the output signal varies but the entire operations and advantages do not vary, such different configurations belong to the scope of the invention. It will be understood by those skilled in the art that the invention can be modified and change in various forms without departing from the spirit and scope of the invention defined by the appended claims.

What is claimed is:

1. A dual display control device controlling a first display device and a second display device using an RGB interface, comprising:
   a synchronization signal output unit that outputs vertical and horizontal synchronization signals to the first display device and the second display device; and
   a data output unit that outputs first data to the first display device in a first section of a first pixel clock and outputs second data to the second display device in a second section of a second pixel clock, in accordance with the vertical and horizontal synchronization signal via a data line shared by and connected to the first display device and the second display device device,
   wherein the synchronization signal output unit outputs the vertical synchronization signal to one signal line that is shared by and connected to the first display device and the second display device, and outputs the horizontal synchronization signal to another signal line that is shared by and connected to the first display device and the second display device.

2. The dual display control device according to claim 1, wherein the first section of the first pixel clock and the second section of the second pixel clock are rising edge sections.

3. The dual display control device according to claim 1, wherein the first pixel clock and the second pixel clock have a phase difference.

4. The dual display control device according to claim 1, wherein the first pixel clock and the second pixel clock are the same pixel clock, the first section of the pixel clock is a rising edge section, and the second section of the pixel clock is a falling edge section.

5. The dual display control device according to claim 1, wherein the synchronization signal output unit outputs the vertical and horizontal synchronization signals corresponding to different resolutions to the first display device and the second display device via the one signal line and the another signal line.

6. The dual display control device according to claim 1, wherein a phase difference between the first pixel clock and the second pixel clock is one of 90 degrees and 180 degrees.

7. A dual display control method of a dual display control device controlling a first display device and a second display device using an RGB interface, comprising:
   outputting vertical and horizontal synchronization signals to the first display device and the second display device; and
   outputting first data to the first display device in a first section of a first pixel clock and outputting second data to the second display device in a second section of a second pixel clock, in accordance with the vertical and horizontal synchronization signal via a data line shared by and connected to the first display device and the second display device,
   wherein the outputting of the vertical and horizontal synchronization signals to the first display device and the second display device includes outputting the vertical synchronization signal to one signal line that is shared by and connected to the first display device and the second display device, and outputting the horizontal synchronization signal to another signal line that is shared by and connected to the first display device and the second display device.

8. The dual display control method according to claim 7, wherein the first section of the first pixel clock and the second section of the second pixel clock are rising edge sections.

9. The dual display control method according to claim 7, wherein the first pixel clock and the second pixel clock have a phase difference.

10. The dual display control method according to claim 7, wherein the first pixel clock and the second pixel clock are the same pixel clock, the first section of the pixel clock is a rising edge section, and the second section of the pixel clock is a falling edge section.

11. The dual display control method according to claim 7, wherein the vertical and horizontal synchronization signals corresponding to different resolutions are output to the first display device and the second display device via the one signal line and the another signal line.

12. The dual display control method according to claim 7, wherein a phase difference between the first pixel clock and the second pixel clock is one of 90 degrees and 180 degrees.

* * * * *